June 21, 1949.  F. G. McCUTCHEON  2,473,962
PROCESS FOR RECOVERING CADMIUM
Filed Dec. 1, 1944
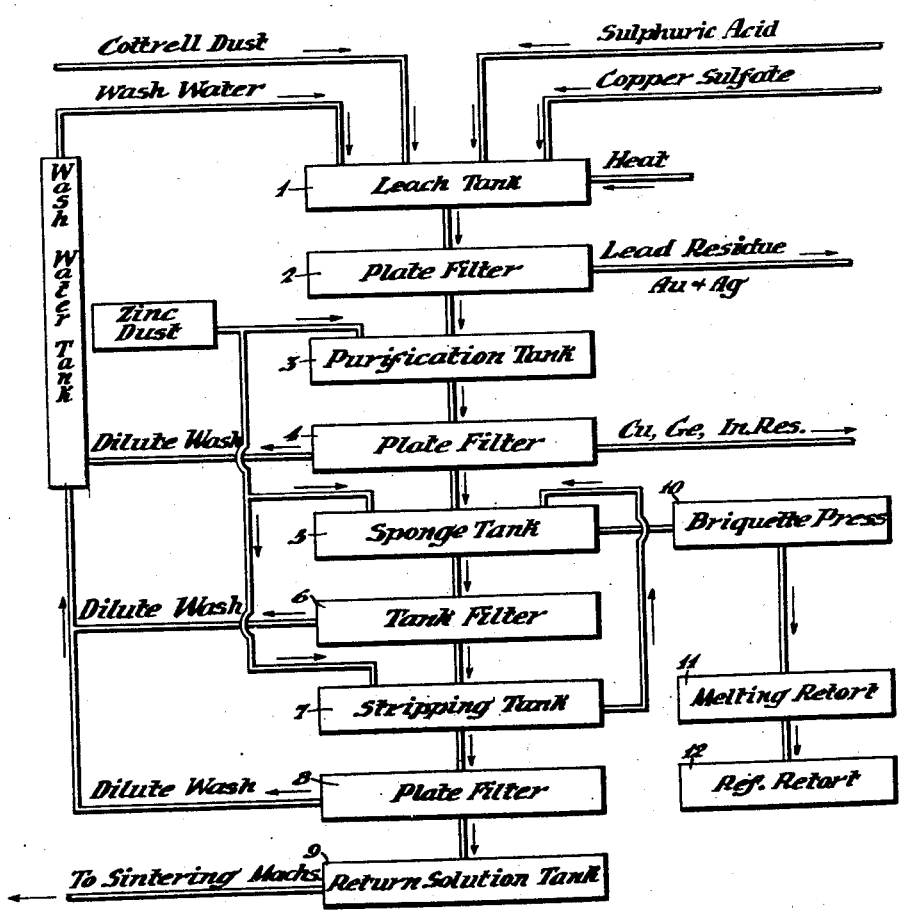
INVENTOR.
FRANK G. McCUTCHEON
BY Patented June 21, 1949

2,473,962

UNITED STATES PATENT OFFICE 2,473,962

PROCESS FOR RECOVERING CADMIUM

Frank G. McCutcheon, Henryetta, Okla., assignor to The Eagle-Picher Company, a corporation of Ohio Application December 1, 1944, Serial No. 566,216

2 Claims. (Cl. 75—115)

This invention relates to a process of recovering cadmium and small amounts of lead, copper, germanium and indium from the metallurgical dust recovered from the Cottrell precipitator in zinc smelting operations.

This process is an improvement upon similar processes of this general type in that it dispenses with the use of sodium chlorate, which is a war chemical and therefore difficult to procure. It is at the present time, and has been for several years, under strict allocation by the War Production Board, and often firms having high priorities do not always find it available to them. It is also dangerous to ship and to use.

The Cottrell dust used as a raw material in this process originates as a by-product of the sintering of zinc ore from the tri-state district, i. e., Missouri, Oklahoma and Kansas, and contains ten to fifteen percent of cadmium, eighteen to twenty-five percent of lead, fifteen to twenty-five percent of zinc, and small quantities of germanium, indium, copper, gold, silver, and from eighteen to twenty-five percent of combined chlorine. The latter is derived from a chloridizing roast to which the zinc ore is subjected before smelting. Since such a roast is a conventional step, the details of which are well known, it is unnecessary to describe the treatment of the ore previous to the recovery of the Cottrell dust.

Referring now to the accompanying drawing, this is a flow sheet illustrating the process. As preferably carried out, the dust is treated in batches of 10,000 pounds each, and this quantity is digested in the first leach tank with mechanical and air agitation with about six volume tons of sulphuric acid and water, the strength of which is adjusted until it is in excess only by eight to twelve grams per liter. About six volume-tons of dilute acid are used per ton of dust. The digestion in the leach tank is carried out at 90° C. and serves the purpose of decomposing sulphites present in the dust, thereby liberating sulphur dioxide which escapes from the tank through a ventilating system. Compressed air is preferably bubbled through the tank to assist the escape of the gas.

Tests are made from time to time to ascertain the $SO_2$ content of the liquid. When there is no noticeable odor of $SO_2$ copper sulphate is added to complete the reaction and decompose the cadmium sulphide that was precipitated with the earlier decomposition by the sulphuric acid of some of the sulphides present. The reaction which occurs is substantially as follows:

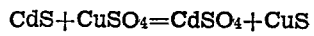

$$CdS + CuSO_4 = CdSO_4 + CuS$$

The lead which is present, probably much of it as chloride, is converted to insoluble lead sulphate.

The digestion of the cadmium and most of the other metals is complete after about 20 hours, and the solution is ready for the separation of the soluble from the insoluble constituents. The agitators of the leach tank are stopped and the solids allowed to settle to the bottom of the tank. As soon as a clear supernatant liquid has been obtained, the clear solution is decanted to tank #3. The remaining solids are treated with about two times their volume of wash water and the agitators are again started for the purpose of mixing water with the solids. These solids, with the wash water, are now filtered through a plate and frame filter indicated as #2 in the drawing, the solution going to tank #3 to join the decanted portion previously drawn off. Washing of the insoluble is performed merely to increase the efficiency of the process and may be dispensed with if desired.

The solution now in tank #3 is treated with just enough zinc dust to remove the copper, including whatever indium and germanium may also be present. Removal of these constituents greatly improves the quality of the cadmium sponge which is to be made in the subsequent step. The treatment consists merely in adding the zinc dust with moderate agitation, then when the reaction is complete, the solution is filtered on a filter press #4. The solids are recovered for other uses and the solution containing cadmium sulphate is transferred to tank #5.

In tank #5 treatment with zinc dust is repeated after first adjusting the acid content to 12 to 15 grams $H_2SO_4$ per liter. Enough zinc dust is now added to precipitate only about 98% of the cadmium present. It is necessary to lose about 2% since this prevents excess zinc remaining in the cadmium sponge which is precipitated. This step is complete in about one and one-half hours under conditions of moderate mechanical agitation.

The contents of tank #5 are now transferred into a filter tank #6 having a canvas filter bottom, the filtrate going to tank #7. Cadmium sponge is removed by the canvas and is washed on the latter, the wash water going to storage to be used for diluting the sulphuric acid used in the first step.

Clean sponge from filter tank #7 is transferred to a pneumatic press #10 for pressing into briquettes. The briquettes are melted in a retort #11, the cadmium metal being drawn off for further refining in a retort #12 by distillation. Other refining steps for the cadmium may be practiced before the latter is cast into balls for shipment.

The filtrate from the sponge removal operation may be given a further treatment with zinc dust to remove the remaining cadmium as sponge, the filtrate being removed in a filter #8, the filtrate going to tank #9, and the sponge which is recovered being transferred to tank #5 at the start of the next batch. The solution in tank #9 is now devoid of cadmium but contains zinc values which may be recovered by being sent to the sintering machines in which the chloridizing roast is performed.

I claim as my invention:

1. In a process for recovering cadmium from a cadmium containing smelter fume, the steps of digesting the fume with dilute aqueous sulphuric acid, adjusting the amount of sulphuric acid in the solution formed to approximately 8 to 12 grams per liter, converting the cadmium sulphide present to a soluble condition by adding thereto cupric sulphate, removing cupric sulphide formed by the reaction of said cupric sulphate with any sulphides present, precipitating the copper and any indium and germanium which may be present with just sufficient zinc to accomplish the precipitation, removing the precipitates, adjusting the acid content of the solution to approximately 12 to 15 grams of sulphuric acid per liter, and then precipitating the cadmium by the addition of zinc.

2. A process for recovering cadmium from a precipitated cadmium containing metallurgical fume which comprises digesting said fume with dilute aqueous sulphuric acid, the amount of said acid being in excess of the basic constituents which may be present by approximately 8 to 12 grams per liter, removing from the solution any sulphur dioxide which may be formed, adding cupric sulphate to convert any cadmium sulphide present to cadmium sulphate, removing the precipitate, then precipitating and removing copper, indium, and germanium by the addition of just sufficient zinc dust to accomplish removal, filtering the resulting solution, adjusting the acid content of the solution to between 12 to 15 grams of sulphuric acid per liter and then adding sufficient zinc dust to precipitate about 98 per cent of the cadmium present as a cadmium sponge, and removing the sponge from the solution.

FRANK G. McCUTCHEON.

REFERENCES CITED

The following references are of record in the file of this patent:

UNITED STATES PATENTS

| Number | Name | Date |
|---|---|---|
| 1,180,765 | Durant | Apr. 25, 1916 |
| 1,396,740 | Ganelin | Nov. 15, 1921 |
| 1,410,936 | Leaver et al. | Mar. 28, 1922 |
| 1,426,703 | Avery et al. | Aug. 22, 1922 |
| 1,618,187 | Greenawalt | Feb. 22, 1927 |
| 1,869,259 | Hughes et al. | July 26, 1932 |
| 2,128,379 | Spencer | Aug. 30, 1938 |

FOREIGN PATENTS

| Number | Country | Date |
|---|---|---|
| 466,534 | Great Britain | May 31, 1937 |